United States Patent [19]

Steenblock et al.

[11] Patent Number: 5,750,232
[45] Date of Patent: May 12, 1998

US005750232A

[54] PLASTIC COMPOSITE MATERIAL, A METHOD OF PRODUCING IT AND THE USE OF THIS MATERIAL

[75] Inventors: Roland Eugen Steenblock. Meckenheim; Joachim Bührmann. Bonn, both of Germany

[73] Assignee: Elf Atochem Deutschland GmbH. Dusseldorf, Germany

[21] Appl. No.: 495,802

[22] Filed: Jun. 27, 1995

[30] Foreign Application Priority Data

Jul. 14, 1994 [DE] Germany ............... 44 24 864.4

[51] Int. Cl.$^6$ ............... B32B 3/00
[52] U.S. Cl. ............... 428/98; 428/103; 428/156; 428/172; 428/423.5; 528/289; 528/300; 528/288; 525/420; 525/425; 525/432; 525/436
[58] Field of Search ............... 528/288, 289, 528/300; 525/240, 420, 425, 432, 436; 428/98, 103, 156, 172, 423.5

[56] References Cited

U.S. PATENT DOCUMENTS

| | | | |
|---|---|---|---|
| 4,483,975 | 11/1984 | de Jong et al. ............... | 528/288 |
| 4,774,001 | 9/1988 | Degen et al. ............... | 210/490 |

FOREIGN PATENT DOCUMENTS

| | | |
|---|---|---|
| 0 504 784 A1 | 9/1992 | European Pat. Off. . |
| 37 30 504 C1 | 3/1989 | Germany . |
| 38 26 089 A1 | 2/1990 | Germany . |
| 40 16 348 A1 | 11/1991 | Germany . |
| 41 29 188 A1 | 3/1993 | Germany . |

OTHER PUBLICATIONS

Derwent English Abstract, WPI Acc. No. 92-317695/39 corresponding to EP 0 504 784 A1.

Derwent English Abstract, WPI Acc. No. 89-077887/11 corresponding to DE 37 30 504 C1.

Derwent English Abstract, WPI Acc. No. 93-077763/10 corresponding to DE 41 29 188 A1.

Derwent English Abstract, WPI Acc. No. 91-354911/49 corresponding to DE 40 16 348 A1.

Derwent English Abstract, WPI Acc. No. 90-052260/08 corresponding to DE 38 26 089 A1.

*Primary Examiner*—Richard Weisberger
*Attorney, Agent, or Firm*—Merchant, Gould, Smith, Edell, Welter & Schmidt

[57] ABSTRACT

This invention relates to a plastic composite material which comprises:

- a thermoplastic plastic sheet and, bonded to one side thereof,
- a thermoplastic spun felt comprising a hot-melt adhesive, to a method of producing it and to its use.

5 Claims, No Drawings

PLASTIC COMPOSITE MATERIAL, A METHOD OF PRODUCING IT AND THE USE OF THIS MATERIAL

The present invention relates to a plastic composite material, to a method of producing it and to the use of this plastic composite material.

When coating foamed bodies—with textile outer materials for example—the problem always exists of producing, in a simple manner, a coating which adheres firmly to the foamed body. Thus in the manufacture of automobile seats in the automobile industry, for example, the foamed material was first produced separately and this was then coated with a textile outer material by sewing the latter on. However, this joining process had the disadvantage that the textile outer material was not joined to the foamed body over the whole surface, so that troublesome fold formations or the tearing of seams at the edges could occur. For this reason a changeover was made to the production of adhesive bonds between the foamed body and the textile outer material. In the process used in the prior art, the procedure hitherto was that an intermediate sheet was flame-laminated on to a composite comprising a textile outer material and the so-called flame-laminated foamed material, on to which intermediate sheet the polyurethane foam was then expanded. In principle, the function of this intermediate sheet was to prevent penetration of the polyurethane foam and of the composite material comprising the textile outer material and the flame-laminated foamed material, since this otherwise becomes boardy. This process is very expensive, because a further flame-laminating step is necessary in order to join the composite body comprising the textile outer material and the flame-laminated foamed material to the intermediate sheet. This constitutes a separate process step and necessitates a corresponding installation therefor. The object of the present invention was to simplify the prior costly process for joining the textile outer material and the foamed body, which required two flame-laminating steps, and thus ultimately to make it less expensive. Surprisingly, this object can be achieved by providing a plastic composite material which comprises:

a thermoplastic plastic sheet and, bonded to one side thereof, a thermoplastic spun felt comprising a hot-melt adhesive.

The spun felt preferably has a lower melting temperature than the plastic sheet. In this invention the melting temperature is defined as the maximum of the melting range, which is determined by the differential scanning calorimetry method (DSC). The plastic sheet preferably still exhibits no significant softening at the melting temperature of the spun felt. This means that the sheet still substantially retains its mechanical strength at this temperature, i.e. that the plastic composite material can be processed without problems. The melting temperature of the spun felt is preferably 80° C. to 130° C.

The thickness of the plastic sheet is preferably 20 μm to 80 μm. In principle, the thermoplastic plastic sheet can be formed by any thermoplastic plastic sheet which can be processed to form a sheet. For example, the thermoplastic plastic sheet may consist of thermoplastic polyether urethane(s), polyester urethane(s), polyether block amide(s) and/or polyether ester(s).

Hot-melt adhesives known in the art may be used as the hot-melt adhesive which forms the thermoplastic spun felt, such as those described in the following publications for example: DE-A-23 24 160, DE-A-23 24 159, DE-A-37 30 504, DE-A-32 47 755 and EP-A-0 504 784. Copolyamides according to DE-A-37 30 504 are particularly preferred, i.e. copolyamides comprising:

10 to 50% by weight of caprolactam, 20 to 70% by weight of laurolactam, and 10 to 40% by weight of an adduct comprising equimolar amounts of piperazine and $C_6$–$C_{13}$ dicarboxylic acids or $C_{36}$ dimerised fatty acids.

The weight of the thermoplastic spun felt is preferably 15 to 50 $g/m^2$.

The plastic composite material according to the invention can be produced in a simple manner by the process of the invention by adhesively bonding the spun felt to the plastic sheet. In this respect, the material forming the spun felt is advantageously extruded in the manner known in the art and the intermingled spun felt is deposited before cooling on the thermoplastic plastic sheet which is travelling past. After the spun felt has cooled, it adheres to the plastic sheet. The use of the copolyamide according to the aforementioned DE-A-37 30 504 as the spun felt material in the production of the plastic composite material according to the invention has surprisingly proved to be particularly advantageous. Because it crystallises very rapidly, this copolyamide can be continuously deposited from above, immediately after the extrusion and spun felt production step, on to the higher-melting sheet which is travelling past parallel to it, whereupon a firm bond is formed between the spun felt and the plastic sheet. At the end of the conveyor belt the composite material can then be wound up immediately without the rolls sticking together. The insertion of a siliconised paper between the layers of composite material is generally not necessary. It was also particularly surprising that when using the said copolyamide according to DE-A-37 30 504 no shrinkage stresses occurred due to the subsequent crystallisation of the spun felt. In particular, such shrinkage stresses result in what are termed Kallen effects, in which the edges of the sheet are lifted. This leads to severe problems during subsequent processing, for instance during the production of automobile seats described above, since the sheets can then no longer easily be placed in the mould for the foamed material.

With the plastic composite material according to the invention, an intermediate sheet can easily be bonded to a composite material comprising a textile outer material and a flame-laminated foam, for example by drawing the plastic composite material according to the invention by suction on to the composite material comprising a textile outer material and a flame-laminated foam in a vacuum suction mould, softening the lower-melting spun felt from the thermoplastic plastic sheet side, by blowing with hot air for example, and adhesively bonding it to the textile composite material on cooling. The material forming the foamed body can then be foamed in situ in this mould.

This process makes it possible to produce automobile seats simply and efficiently, for example. The use of the plastic composite material according to the invention is not restricted to applications such as this, however, and the plastic composite material according to the invention can be used to solve very different industrial coating problems. Thus the plastic composite material according to the invention can be used quite generally for the cladding of foam components and sound insulation boards.

The invention will be explained by means of the following example of production and example of use.

EXAMPLE OF THE PRODUCTION OF THE PLASTIC COMPOSITE MATERIAL

A copolyamide having the following monomer composition was produced by a customary condensation polymerisation method (e.g. as described in DE-A-37 47 755):

30% by weight of caprolactam,

50% by weight of laurolactam, and

20% by weight of equimolar amounts of piperazine and decanedicarboxylic acid.

The resulting copolyamide had a melting range of 94° to 128° C. as determined by the differential scanning calorimetry method (DSC). The melting temperature, defined as the maximum of the melting range, was 108° C. The copolyamide produced in this manner had a relative solution viscosity of 1.50 (0.5% solution in m-cresol at 20° C.) and a melt-flow index (according to DIN 53735) at 150° C. of 15 g / 10 minutes at 2.16 kp.

This copolyamide was extruded at 200° C. in a commercially available laboratory extruder which was provided with a spinning head having 50 orifice nozzles. After slight intermingling in an air current the spun felt formed was deposited on a polyurethane sheet of thickness 30 μm which was travelling past synchronously. After cooling, the spun felt adhered firmly to the polyurethane sheet and could be wound without problems on to a cardboard spool after a total travel of 10 meters. The spun felt had a weight of 20 g per square meter. The plastic composite material could be unwound and cut without problems during further processing.

EXAMPLE OF USE

The plastic composite material produced above was placed with its spun felt side on the foam side of a textile which was flame-laminated to a foamed material and was heated, by blowing with hot air using a hot air drier, from the side of the thermoplastic plastic film and bonded under a pressure of 0.3 bar. After cooling, the bond obtained could only be delaminated by destroying the foamed material.

We claim:

1. A plastic composite material which comprises:

a thermoplastic plastic sheet and, bonded to one side thereof, a thermoplastic a hot-melt copolyamide adhesive in the form of a spun felt which is produced by applying the hot-melt copolyamide adhesive in a hot, melted state onto the plastic sheet so as to hot-melt adhesively bond the spun felt to the plastic sheet; wherein, the hot-melt copolyamide adhesive has a lower melting temperature than the plastic sheet, the melting temperature being determined as the maximum of the melting temperature range as determined by differential scanning calorimetry: and, the copolyamide is a polymerization reaction product of 10 to 50% by weight of caprolactam, 20 to 70% by weight of laurolactam, and 10 to 40% by weight of an adduct comprising equimolar amounts of piperazine, and $C_6$–$C_{13}$ dicarboxylic acids or $C_{36}$ dimerised fatty acids.

2. A plastic composite material according to claim 1, wherein the spun felt has a melting temperature of 80° C. to 130° C.

3. A plastic composite material according to claim 2, wherein the plastic sheet has a thickness of 20 μm to 80 μm.

4. A plastic composite material according to claim 3, wherein the plastic sheet is selected from the group consisting of thermoplastic polyether urethane(s), polyester urethane(s), polyether block amide(s), polyether ester(s) and mixtures thereof.

5. A plastic composite material according to claim 7, wherein the spun felt has a weight of 15 to 50 g/m².

\* \* \* \* \*